United States Patent [19]

Corbett et al.

[11] Patent Number: 4,703,694

[45] Date of Patent: Nov. 3, 1987

[54] SINGLE STAGE AUTOPHAGE ROCKET

[75] Inventors: Marshall J. Corbett, Northport; Joseph A. Belisle, West Babylon, both of N.Y.

[73] Assignee: Grumman Aerospace Corporation, Bethpage, N.Y.

[21] Appl. No.: 660,668

[22] Filed: Oct. 15, 1984

[51] Int. Cl.[4] .............................................. F42B 15/10
[52] U.S. Cl. .................................... 102/374; 102/348; 102/364; 102/515; 60/253
[58] Field of Search ............... 102/347, 348, 364, 374, 102/465, 515; 60/253

[56] References Cited

U.S. PATENT DOCUMENTS

| | | | |
|---|---|---|---|
| 2,981,060 | 4/1961 | Barnes | 60/35.6 |
| 2,987,881 | 6/1961 | Mullane | 60/35.6 |
| 3,017,746 | 1/1962 | Kiphart | 60/35.6 |
| 3,017,836 | 1/1962 | Guay | 102/49 |
| 3,067,575 | 12/1962 | Corbett | 60/35.6 |
| 3,127,739 | 4/1964 | Miller | 60/35.6 |
| 3,250,216 | 5/1966 | Typaldos | 102/49 |
| 3,865,035 | 2/1975 | Munson et al. | 102/364 |
| 4,063,415 | 12/1977 | Rhoades | 60/261 |
| 4,119,036 | 10/1978 | Hayashi et al. | 102/374 |
| 4,176,607 | 12/1979 | Kishi et al. | 102/374 |
| 4,574,700 | 3/1986 | Lewis | 102/374 X |

FOREIGN PATENT DOCUMENTS 1298388 5/1961 France .
2296101 12/1975 France .

OTHER PUBLICATIONS

"Hybrid Air-Gulping Rocket Enters its Final Design Phase," Product Engineering, vol. 41, No. 9, Apr. 27, 1970, pp. 18, 19.

Primary Examiner—Peter A. Nelson
Attorney, Agent, or Firm—Pollock, VandeSande & Priddy

[57] ABSTRACT

An autophage rocket has its casing constructed from KEVLAR-epoxy material which is itself combustible and stores liquid propellant. As the propellant is consumed during flight, the casing is combusted so that the pressure within the casing remains constant. A secondary nozzle is mounted to the outlet end of the rocket and cooperates with a ram-rocket construction to achieve additional impulse. A multiplicity of rocket motors are fed from a single stage tank to enable controlled motion of the rocket.

10 Claims, 7 Drawing Figures

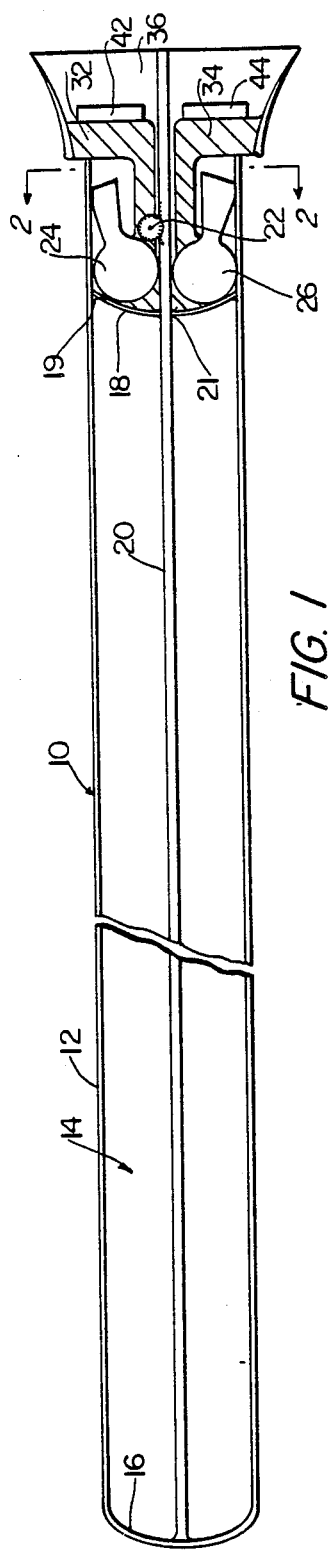
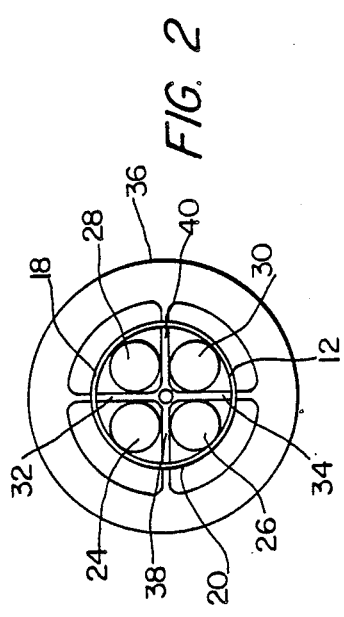
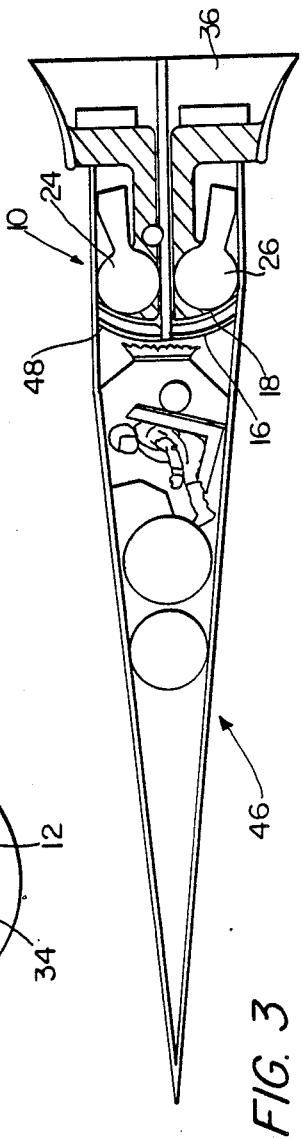
FIG. 1
FIG. 2
FIG. 3

SINGLE STAGE AUTOPHAGE ROCKET

FIELD OF THE INVENTION

The present invention relates to rockets and more particularly to an autophage self-consuming rocket wherein the rocket casing becomes consumed during flight thereby decreasing the rocket weight.

BRIEF DESCRIPTION OF THE PRIOR ART

In order to minimize the effects of weight which limit the performance of a rocket, large air-breathing aircraft consist of complex mechanisms. One contemporary air-breathing aircraft of this type includes a first stage operating with: (1) a turbojet-propelled take-off mode, followed by (2) after burning acceleration to approximately Mach 3.0, and then (3) supersonic combustion ram jet propulsion to Mach 5.0–8.0 (using liquid hydrogen fuel), and finally (4) by fuse rocket into low Earth orbit. It is our contention that such an air-breathing rocket first stage is inordinately expensive and involves considerable reliability problems.

Better use can be made of the rather low specific impulse ($I_{sp}$) of available storable monopropellant liquid rocket fuels if one pays specific attention to the mass fraction of a launch vehicle system which may be considered as the ratio of total vehicle hardware weight as a fraction of total launch pad weight (including fuel).

The prior art has developed a concept of an autophage rocket which produces self consumption of the rocket casing during flight in an area of the casing corresponding to expended fuel.

The most relevant prior art is U.S. Pat. No. 3,127,739 issued to Miller on Apr. 7, 1964. This patent is directed to the physics of discarding inert weight as a rocket vehicle accelerates without dropping boosters. The patented device is directed to a solid propellant rocket which comprises a casing wall 20 having inner and outer wall members 22 and 24 filled with a solid propellant material 20 to ensure that the metal burns. The great disadvantage of the Miller device is the utilization of a double-walled container having wall members 22, 24 which adds greatly to the inert weight of the rocket. Accordingly the patented rocket design is of limited utility.

BRIEF DESCRIPTION OF THE PRESENT INVENTION

The present invention is an improvement over the prior art and of particular importance is the construction of a single-walled rocket casing from a material which is self consuming (does not require contact with a solid propellant) and still has the required structural strength. The preferred material of the present invention is non-metallic and therefore does not conduct heat nearly as fast as a metal casing which ensures that the burning surface will be only at the rocket exhausts, and not destructively forward of that point.

The present invention permits the utilization of the principle of ram-rocket (air-breathing when in air) and a secondary nozzle to expand the combustion products of the casing, as they are consumed, for additional impulse.

The present invention further includes a multiplicity of rocket motors which provide an inter-motor space for permitting the insertion of struts therebetween which are required to carry the secondary nozzle. The struts further provide a convenient place for mounting vanes which permits steering and stabilization of the vehicle. By individually controlling the multiplicity of rocket motors, an alternate form of controlled rocket movement may be effected.

BRIEF DESCRIPTION OF THE FIGURES

The above-mentioned objects and advantages of the present invention will be more clearly understood when considered in conjunction with the accompanying drawings, in which:

FIG. 1 is a diagrammatic cross-sectional view illustrating the basic internal components of an autophage rocket, in accordance with the present invention;

FIG. 2 is a bi-directional diagrammatic sectional view taken along a plane passing through section line 2—2 of FIG. 1;

FIG. 3 is a diagrammatic sectional view of an autophage rocket utilized as a booster for a manned space vehicle;

DETAILED DESCRIPTION OF THE INVENTION

Figure 6:
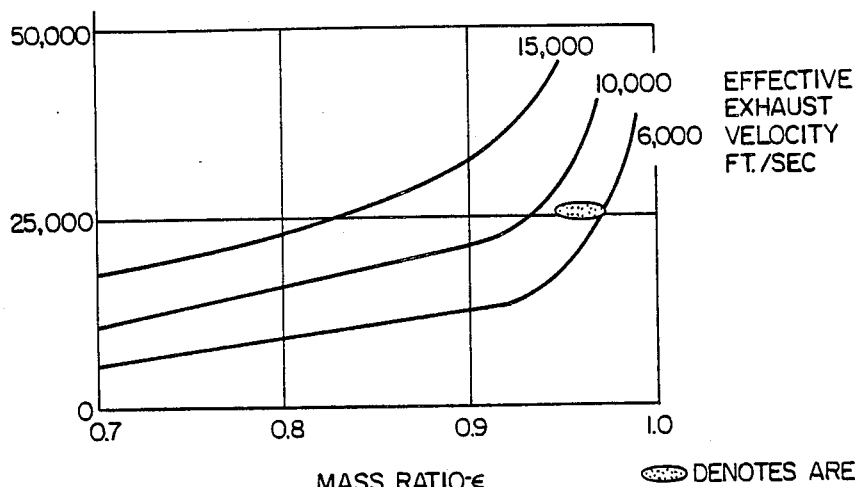
FIG. 6 is a plot of maximum vehicle velocity as a function of mass ratio.
Figure 7:
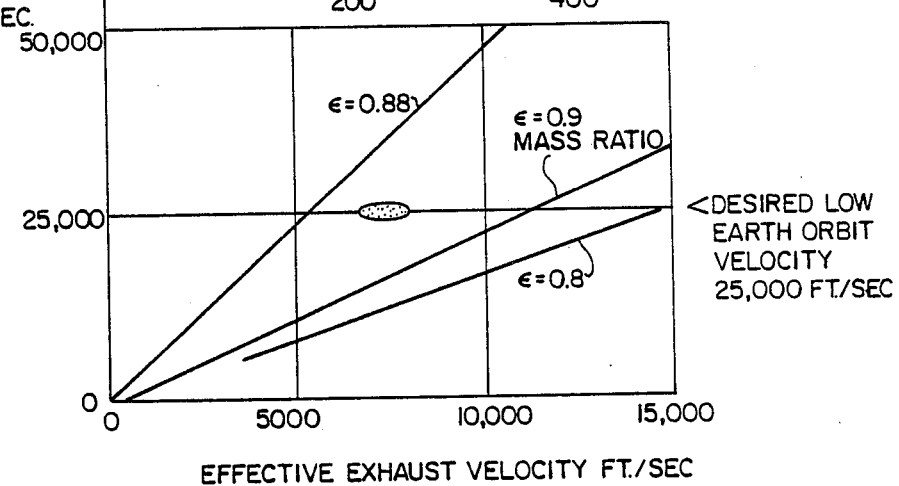
FIG. 7 is a plot of maximum vehicle velocity as a function of effective exhaust velocity.

It is a primary contention of the inventors that better use can be made of the rather low specific impulse ($I_{sp}$) of today's storable monopropellant rocket fuels, if specific attention is paid to the mass fraction of a launch vehicle system. The plots of FIGS. 6 and 7 illustrate the interrelationship between effective rocket exhaust velocity (which can be equated to $I_{sp}$, the mass fraction or ratio ($\epsilon$) of the total vehicle system metallic or "hardware" weight as a fraction of the total launch pad weight, and desired orbital velocity which, for example, may nominally be 25,000 ft./second referenced to zero Earth surface velocity. The plots demonstrate that, if it is possible to achieve a mass fraction of 95% (i.e., 95% fuel out of 100% launch pad weight), then one can achieve orbital velocity in a single-stage vehicle with a single propulsion system as opposed to a multiple propulsion system. This would be so even if the $I_{sp}$ is as low as 220 seconds which is typical of monopropellants. However, this is not possible without consuming a large part of the tank or casing weight during the ascent phase and having the consumption of this tank weight become a significant addition to the thrust of the system. In the prior art previously explored, the rocket casing is consumed but, due to the utilization of a metallic wall, objectionable dead weight must be overcome at the outset of flight.

FIG. 1 schematically illustrates a cross-sectional view of a rocket employing an improved autophage system. As the outer casing 12 of rocket 10 is "pulled down" over a nest of four rocket motors 24, 26 and 28, 30 (FIG. 2), the tubular casing 12 forming the rocket tank is consumed by the rocket motor exhausts. Thus, the amount of mass being accelerated by the rocket is continuously decreasing and at burnout the forward dome portion 16 of the casing will be positioned in overlying relation with the rear dome portion 18. Of course, the higher the fineness ratio of the tubular tank (length divided by diameter), more of the casing is consumed by the exhausts thereby increasing the final mass fraction.

A central tube 20 having a rack gear machined therein draws down dome portion 16 into confronting proximity with dome portion 18. The rate of this "draw down" depends upon the consumption of liquid fuel contained within the storage volume 14 of casing 12. In order to seal the propellant within casing 12, O-ring seals 19 and 21 each respectively form a fluid seal with the dome portion 18.

Figure 4:
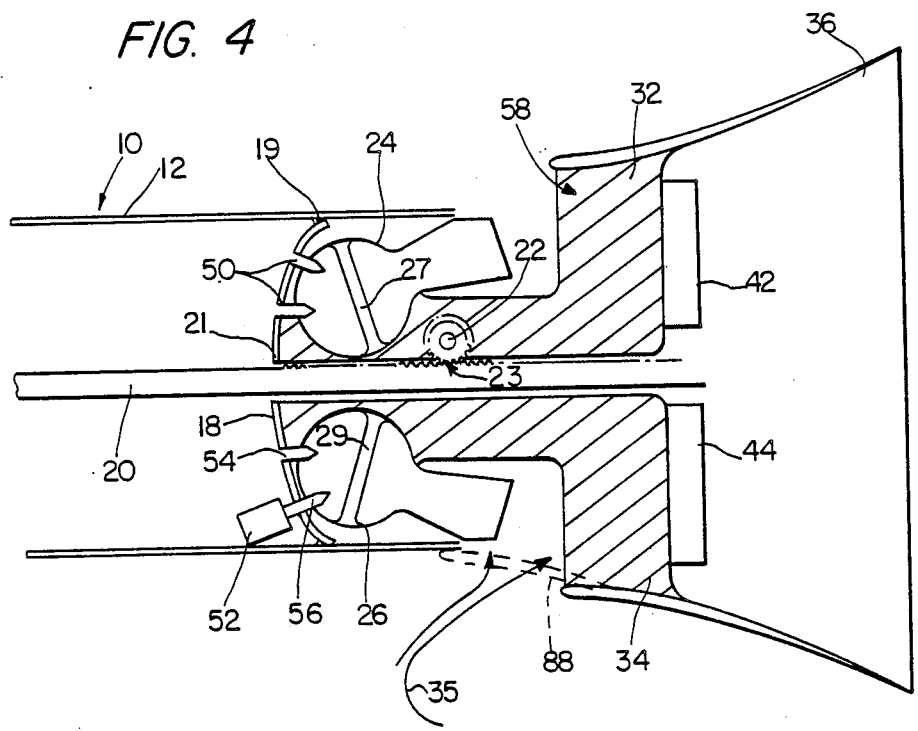
FIG. 4 is a detailed diagrammatic view of the aft end of the autophage rocket in accordance with the present invention.

FIG. 4 illustrates in greater detail the components located in the aft end of the rocket. Outwardly of the exhaust end 31 of each motor is a space 35 where combustion of the tubular casing end occurs as the casing is "drawn down." As will be clearly shown in FIG. 4, gear teeth 23 are machined into the surface of the central tube 20 and are engaged by pin gear 22 which displaces central tube 20 from left to right, as viewed in FIG. 4. The sealing characteristics of the drive are increased by preferably having a plastic (polymer) coating over the central tube such that it can be drawn through seal 21 smoothly.

A high internal pressure in the monopropellant tank (typically 300 psi) is created without the use of gas pressure, and a controllable feed rate is established, such that the rate of consumption of the tubular portion of the tank exactly matches the rate at which that portion of the tank is being consumed at the rocket exhausts. Additional impulse for the rocket is gained by channeling the exhaust from the burned casing through an annular expansion nozzle 36 which is supported by four perpendicularly oriented struts 32, 34, 38 and 40 as shown in FIG. 2. Thus, the annular nozzle supported by the struts directs the thrust developed by consumption of fuel and casing into the main body of rocket 10. Attitude control vanes such as 42 and 44 may be connected to the aft edge of each strut in order to control the position of the rocket in flight.

By carefully considering FIGS. 2 and 4, it will be noted that the design of the present invention involves the ram-rocket principle when the vehicle is operated within the sensible atmosphere (up to 80,000 feet altitude) and, therefore, a ram inlet 58 is provided at the forward end of the circumferential expansion nozzle 36. The inclusion of a ram-rocket structure and an expansion nozzle to expand the products of casing combustion provides additional impulse which is highly desirable.

By utilizing a single propellant fuel system, disadvantages of bipropellant fuel systems are avoided since the latter unnecessarily complicates the number of tanks, feed pipes, and seals leading to a larger fixed (metallic) weight, thus reducing the mass fraction, although the $I_{sp}$ may be higher.

FIG. 3 illustrates a typical utilization of the present autophage rocket as a booster. As is indicated in the figure, a manned space vehicle generally indicated by reference numeral 46 is connected at its rearward portion to the forward dome portion 16 of rocket 10. Toward the burnout period of flight, the two dome portions 16 and 18 of rocket 10 will confront each other in overlying relation and at that point the rocket 10 may be separated from the space vehicle 46 at junction 48. It is to be emphasized that the invention resides in the rocket construction and not the utilization of the rocket with a manned space vehicle. Unlike the metallic casing and components utilized in prior art autophage rockets, the present invention preferably utilizes composite materials wherever possible. It is extremely important that casing 12 be fabricated from a relatively lightweight and strong material which is itself combustible. In a preferred embodiment of the invention, KEVLAR-epoxy is utilized since it contains about 30% resin, which is quite combustible. A further advantage of this KEVLAR-epoxy material is that it does not conduct heat nearly as fast as metals do, so that the burning surface will be at the rocket exhausts, and not destructively forward of that point. The utilization of KEVLAR-epoxy in rocketry has been explored by the Hercule's Powder Company, which has employed the material as a solid rocket case for the Space Shuttle Solid Rocket Booster. However, the present invention is the first known attempt to employ such a casing as a combustible, expendable rocket housing in accordance with the autophage principle.

An important consideration in the selection of casing material is to choose a material which has an intrinsic heat of combustion, which in combination with the proper monopropellant mixture ratio will actually add the casing's heat of reaction to the total energy of the system. If KEVLAR is employed as the casing material, it is preferable to dissolve ammonium perchlorate ($NH_4ClO_4$) in an ethylene oxide monopropellant ($C_2H_4O$). Then there could be sufficient excess oxygen to "burn" the outer casing even outside the atmosphere. Hydrazine is an alternate acceptable fuel. While in the presence of the atmosphere, the aerodynamic expansion nozzle 36 forming a shroud around the four rocket motors 24, 26, 28 and 30 will provide sufficient oxygen to "burn" the outer casing 12, expand its exhaust products, and produce additional thrust, as in a ram-rocket.

Accordingly, in addition to the propellant, there are three additional sources of thrust which can reduce the mass fraction sensitivity of an autophage rocket. They are: (1) the addition of a miscible oxidizer in the monopropellant fuel so as to raise the fuel's $I_{sp}$; (2) the heat of combustion of the outer casing composite material can be augmented by including a small percentage of oxidizer in its epoxy binders; and (3) the additional impulse ($I_{sp}$) which can be obtained from the sensible oxygen in the atmosphere (up to 80,000 feet) as the rocket rises from sea level to that altitude by relying upon the aerodynamic expansion nozzle 36 and the ram-rocket principle.

Because the present rocket structure is consumable after each flight, the parts must be fabricated at the least possible cost. For this reason, cryogenic propellants have not been considered, nor have storable bipropellants been considered. Rather, enriched storable monopropellants have been selected. The present design also avoids the expense of turbopumps and gas pressurization systems. A simple drive, such as the discussed rack and pinion "pull-down" drive forces the monopropellant into respective rocket engine exhausts in a satisfactory manner. In addition, the present design may avoid expensive gimbaled rocket nozzles. The present invention permits the utilization of simple vanes such as 42 and 44 (FIG. 4) in relatively cool monopropellant exhaust streams. By virtue of the present design, it is possible to exclude regenerative cooling of rocket components since high performance composites such as carbon-carbon composite may be employed.

Considering the rocket motors in detail (as shown in FIG. 4), each of the motors 24, 26, 28 and 30 includes a number of monopropellant spray nozzles 50, 54 and 56 which are preferably in the nature of burst diaphragm closures that inject monopropellant into the rocket motors. Catalyst beds such as 27 and 29 are located in each of the rocket motors and they are typically platinum coated for maximizing combustion efficiency for monopropellant fuel.

Since the present invention is a zero pressure storage system, it can be kept in space without danger of leakage for as long as the life of the batteries permit.

In continued consideration of FIG. 4, the control vanes such as 42 and 44, respectively connected to struts 32 and 34, may be removed in favor of installing a conventional micro-metering valve, such as 52, on each of the monopropellant spray nozzles 50, 54 and 56 because with a spinning missile the timing of side force application with spin rate is very critical. Controlling propellant injection is far less wasteful of chemical energy than the few degrees of lateral control which can be achieved with the control vanes. An additional design consideration may be the inclusion of a side exhaust port (not shown) adjacent to each of the motors 24, 26, 28 and 30 to obtain more lateral reaction forces on the vehicle than is possible with unequal flow through the expansion nozzle 36.

Figure 5:
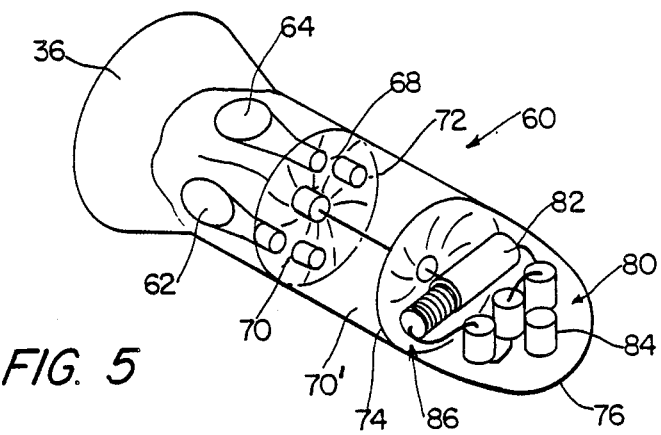
FIG. 5 is a diagrammatic perspective view of the present invention utilizing skewed nozzles to achieve vehicle spin.

In the alternate embodiment shown in FIG. 5, a separate dome 74 is installed within the casing of the illustrated rocket 60. The embodiment of FIG. 5 differs from that of FIG. 4 in that four skewed nozzles 62, 64, 68 and 70 are employed to spin the vehicle which enhances thrust vector control. The dome 74 is drawn down toward dome 72 by an illustrated conductor wire mounted on motor driven winch 86 within nose section 76. Thus, the means for drawing down the domes toward one another, as fuel is consumed, may take a number of forms. The winch motor 82 is powered by batteries 84, all of which are enclosed within the fore portion 80 of nose section 76.

When the rocket is to operate outside the atmosphere, the ram-rocket inlet 58 (FIG. 4) is closed as indicated by dotted lines over the lower inlet, in which case the outer casing 12 would continue to neatly slide into the exhausts of the four rocket motors when combustion of the casing occurs prior to final expansion through nozzle 36.

The preferable use of composite materials may be extended to other rocket parts. The central draw down tube 20 is preferably fabricated from a boron composite material with rack teeth machined into it and the aerodynamically shaped expansion nozzle 36 would preferably be fabricated from a carbon-carbon composite material.

It should be understood that the invention is not limited to the exact details of construction shown and described herein for obvious modifications will occur to persons skilled in the art.

We claim:

1. An autophage rocket comprising:
    a single wall rocket casing for storing fuel and fabricated from a relatively lightweight non-metallic and heat-insulating combustible material;
    a plurality of rocket motors having inlet means for receiving the fuel and generating rocket thrusts during combustion of the fuel;
    an aft end of the casing located adjacent exhaust ports of the rocket motors, the aft end being combustible in the presence of heat generated at the exhaust ports;
    means located within the casing for sliding the aft end of the casing over the exhaust ports resulting in combustion of the casing at a rate corresponding to fuel consumption; and
    expansion nozzle means located rearwardly of the exhaust ports for directing exhaust from the fuel and the consumed portion of the casing, the latter contributing to the thrust developed by the rocket.

2. The rocket set forth in claim 1 wherein a powdered oxidizer is incorporated into the casing material for increasing the efficiency of fuel consumption.

3. The rocket set forth in claim 1 wherein the aft section of the casing has a dome-shaped member transversely oriented with respect to an axis of the casing; and
    a plurality of strut means located between the rocket motors for supporting the nozzle on the dome member.

4. The rocket set forth in claim 3 wherein spaces are present between individual strut means enabling air to flow from points aft of the exhaust ports through the nozzle thereby creating ram-rocket inlets at these spaces.

5. The rocket set forth in claim 3 together with means connected to the strut means for providing attitude control of the rocket when in flight.

6. The rocket set forth in claim 3 wherein the exhaust ports of the rocket motors are skewed thereby causing the rocket to exhibit controlled spin during flight.

7. A single stage autophage rocket comprising:
    a non-metallic, heat-insulative single wall rocket casing fabricated from KEVLAR-epoxy for storing liquid fuel therein;
    a plurality of rocket motors having inlet means for receiving the fuel and generating thrust during combustion of the fuel;
    an aft end of the casing located adjacent exhaust ports of the rocket motors, the aft end being combustible in the presence of heat generated at the exhaust ports at a rate corresponding to fuel consumption; and
    an aerodynamic nozzle located aft of the exhaust ports for directing exhaust from the fuel and the consumed portion of the casing, the latter contributing to the thrust.

8. The rocket structure set forth in claim 7 wherein a powdered oxidizer is incorporated into the KEVLAR-epoxy for increasing the efficiency of fuel consumption.

9. The rocket structure set forth in claim 8 wherein the aft section of the casing has a dome-shaped member transversely oriented with respect to an axis of the casing; and
    a plurality of strut means located between the rocket motors for supporting the nozzle on the dome member.

10. The rocket structure set forth in claim 9 wherein spaces are present between individual strut means enabling air to flow from points aft of the exhaust ports through the nozzle thereby creating ram-rocket inlets at these spaces.

* * * * *

UNITED STATES PATENT AND TRADEMARK OFFICE
CERTIFICATE OF CORRECTION

PATENT NO. : 4,703,694

DATED : November 3, 1987

INVENTOR(S) : Marshall J. Corbett, et al.

It is certified that error appears in the above-identified patent and that said Letters Patent is hereby corrected as shown below:

Column 5, line 9, change "permit" to --permits--.

Signed and Sealed this

Nineteenth Day of July, 1988

Attest:

DONALD J. QUIGG

Attesting Officer

Commissioner of Patents and Trademarks